(12) United States Patent
Conley-Goltz

(10) Patent No.: US 12,035,691 B1
(45) Date of Patent: Jul. 16, 2024

(54) DOG WASTE CARRIER

(71) Applicant: Susan M. Conley-Goltz, Buffalo, NY (US)

(72) Inventor: Susan M. Conley-Goltz, Buffalo, NY (US)

( * ) Notice: Subject to any disclaimer, the term of this patent is extended or adjusted under 35 U.S.C. 154(b) by 184 days.

(21) Appl. No.: 17/690,730

(22) Filed: Mar. 9, 2022

Related U.S. Application Data

(60) Provisional application No. 63/159,011, filed on Mar. 10, 2021.

(51) Int. Cl.
*A01K 27/00* (2006.01)
*E01H 1/12* (2006.01)

(52) U.S. Cl.
CPC .... *A01K 27/008* (2013.01); *E01H 2001/1286* (2013.01)

(58) Field of Classification Search
CPC ............. A01K 27/008; E01H 2001/1286
USPC ................................................ 383/7
See application file for complete search history.

(56) References Cited

U.S. PATENT DOCUMENTS

| | | | | |
|---|---|---|---|---|
| 3,542,263 A * | 11/1970 | Callahan | ........... | A45C 1/06 224/199 |
| 4,047,650 A * | 9/1977 | Domingos | ........... | A45F 5/02 224/232 |
| 4,852,783 A * | 8/1989 | Bryden | ........... | A45F 5/02 229/87.16 |
| 5,233,942 A * | 8/1993 | Cooper | ........... | A01K 27/003 119/858 |
| 5,244,136 A * | 9/1993 | Collaso | ........... | A45F 5/021 383/89 |
| 5,718,192 A * | 2/1998 | Sebastian | ........... | A01K 27/008 D30/162 |
| 5,873,456 A * | 2/1999 | Hull | ........... | H01H 9/0242 206/38.1 |
| 5,890,637 A * | 4/1999 | Furneaux | ........... | A45F 3/00 224/236 |
| D425,266 S * | 5/2000 | Rubinstein | ........... | D30/153 |
| 6,085,695 A * | 7/2000 | Miller | ........... | A01K 27/006 224/604 |
| 6,257,473 B1 * | 7/2001 | Ringelstetter | ........... | E01H 1/1206 224/675 |
| 6,418,881 B1 * | 7/2002 | Starratt | ........... | A01K 27/006 119/769 |
| 6,651,854 B1 * | 11/2003 | LaCoste | ........... | A45F 5/021 224/236 |
| D854,262 S * | 7/2019 | Dunkle | ........... | D30/155 |
| 10,477,839 B2 * | 11/2019 | Gonterman | ........... | A01K 27/005 |
| 10,596,443 B1 * | 3/2020 | Pomroy | ........... | A01K 27/008 |

(Continued)

*Primary Examiner* — Peter N Helvey
(74) *Attorney, Agent, or Firm* — Stadler IP Law PLLC

(57) ABSTRACT

A dog waste carrier that can be securely attached to a leash that is used to walk a dog. The dog waste carrier is discreet and unobtrusive. The dog waste carrier is composed of an exterior panel and an interior panel. The exterior panel has a bag dispenser to hold bags for use while walking a dog. The dog waste carrier also includes a main body having an interior for holding used dog waste bags until the end of the walk. The interior of the main body of the dog waste carrier may be configured to include a pouch to contain a charcoal packet to minimize odors. The dog waste carrier is folded along fold lines to be fitted securely over a dog leash so that the individual does not have to carry the dog waste bag or dog waste carrier while walking.

11 Claims, 6 Drawing Sheets

(56) References Cited

U.S. PATENT DOCUMENTS

| | | | |
|---|---|---|---|
| 10,646,026 B1* | 5/2020 | Clementi | A45F 5/021 |
| D938,105 S * | 12/2021 | Metz | D30/153 |
| D968,078 S * | 11/2022 | Zimmermann | D30/153 |
| 2009/0095225 A1* | 4/2009 | O'Connell | E01H 1/1206 |
| | | | 119/161 |
| 2012/0128276 A1* | 5/2012 | Ortego | A01K 97/06 |
| | | | 383/117 |
| 2015/0144072 A1* | 5/2015 | Whitefield | A01K 27/008 |
| | | | 224/191 |
| 2017/0002531 A1* | 1/2017 | Byham | A01K 27/008 |
| 2019/0124891 A1* | 5/2019 | Swinton | A45C 11/24 |
| 2019/0373861 A1* | 12/2019 | Jirsa | A01K 27/005 |
| 2021/0037787 A1* | 2/2021 | Beck | A01K 23/005 |
| 2022/0007617 A1* | 1/2022 | Lopez | A01K 27/008 |

\* cited by examiner

DOG WASTE CARRIER

CROSS-REFERENCE TO RELATED APPLICATIONS

This application claims priority to U.S. Provisional Application having Ser. No. 63/159,011, filed on Mar. 10, 2021, the entire disclosure of which is hereby incorporated herein by reference.

FIELD OF INVENTION

This invention is directed to a carrier for carrying a dog bag containing dog waste.

BACKGROUND OF INVENTION

When walking a dog outdoors, dogs often defecate during the walk. The person walking the dog typically collects the dog waste in a plastic bag and then disposes this in a garbage can. Often, a garbage can is not available and the person must carry the bag containing dog waste for a long time before he or she can find a garbage can. Carrying a bag of dog waste can be inconvenient, annoying, and embarrassing. Thus, one option is to put the bag containing dog waste into another bag to carry until the end of the walk.

While there are some bags on the market that may be suitable for this purpose, it would be desirable to have a carrier that isn't an additional item for the person to carry. Because the person already has to hold a dog leash, it would be desirable to have an easy to use carrier that can be attached discreetly and securely to the leash for the duration of the walk. Once the walk is over or a garbage can is found, the person may appropriately dispose of the dog waste. The dog waste carrier remains attached to the dog leash and is then ready to use for the next dog walk. The dog waste carrier can also include a deodorizing packet and unused dog waste bags to make the dog waste collection even more convenient.

SUMMARY OF THE INVENTION

Accordingly, it is the subject of this invention to provide a carrier for dog waste that attaches to a leash without the need to carry anything separately.

A dog waste carrier of the present invention is disclosed including: a main body including a top opening and an interior panel having a front and back side and an exterior panel having a front and back side and wherein the interior panel and exterior panel are connected such that an interior of main body is defined by the back side of the interior panel and the back side of an exterior panel; at least two dog leash attachments located at either side of the top of the front side of interior panel and capable of securing the dog waste carrier to a dog leash; at least two connectors or snaps located on either side of the bottom of the front side of the interior panel that are capable of connecting to at least two corresponding connectors or snaps located at either side of the top of the front side of exterior panel; a hook and loop panel, in particular Velcro®, located at the top of the back side of interior panel and a hook and loop panel, in particular Velcro®, located at the top of the back side of exterior panel capable of causing the main body to close; a pouch located in the middle of the front side of exterior panel whereby the pouch includes an opening on the front side of exterior panel and is capable of receiving unused dog waste bags; a grommet located below the pouch and capable of dispensing unused dog waste bags; an interior pouch located in the interior of main body; either side of the top of the interior panel further includes at least two holes capable of receiving the at least two dog leash attachments and wherein the at least two dog leash attachments are cord locks in combination with paracords and wherein the paracords are threaded through the at least two holes of either side of the top of interior panel.

DETAILED DESCRIPTION OF THE INVENTION

Components List

Dog waste carrier—10
Interior Panel—15
Exterior Panel—18
Main body—20
Seam—22
Interior of main body—25
Top section—30
Top fold line—32
Middle section—35
Bottom section—40
Bottom fold line—42
Main body pull tabs—45
Dog leash attachments/cord locks—50
Paracords—52
Holes—54
Interior pouch—55
Dog waste carrier fasteners—60
Exterior pouch—65
Zipper—70
Grommet bag dispenser—75
Hook and loop panel—80
Dog leash—85

Figure 1:
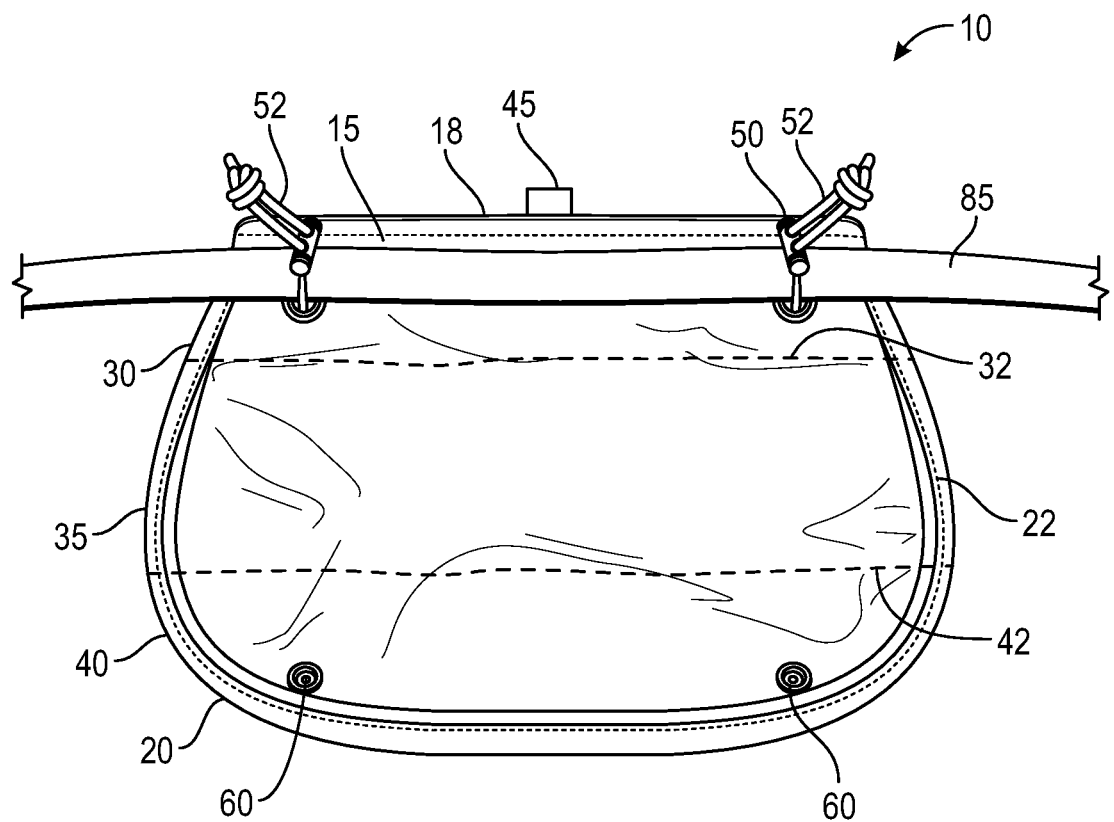
FIG. 1 depicts a back view of a dog waste carrier of the present invention.

Turning to FIG. 1, a back view of a dog waste carrier 10 is depicted. Interior panel 15 and exterior panel 18 are shown, both having a front side and a back side. Preferably, interior panel 15 and exterior panel 18 are sewn together along seam 22 to form a main body 20 and an interior of main body 25 (FIG. 3), wherein the interior of main body 25 is formed by the back side of interior panel 15 and the back side of exterior panel 18. In less preferable embodiments, interior panel 15 and exterior panel 18 may be connected in any suitable manner to form main body 20. It is noted that seam 22 is only sewn along the sides and bottom of interior panel 15 and exterior panel 18, thereby allowing interior of main body 25 to be accessed at the top of main body 20 of dog waste carrier 10.

Figure 4:
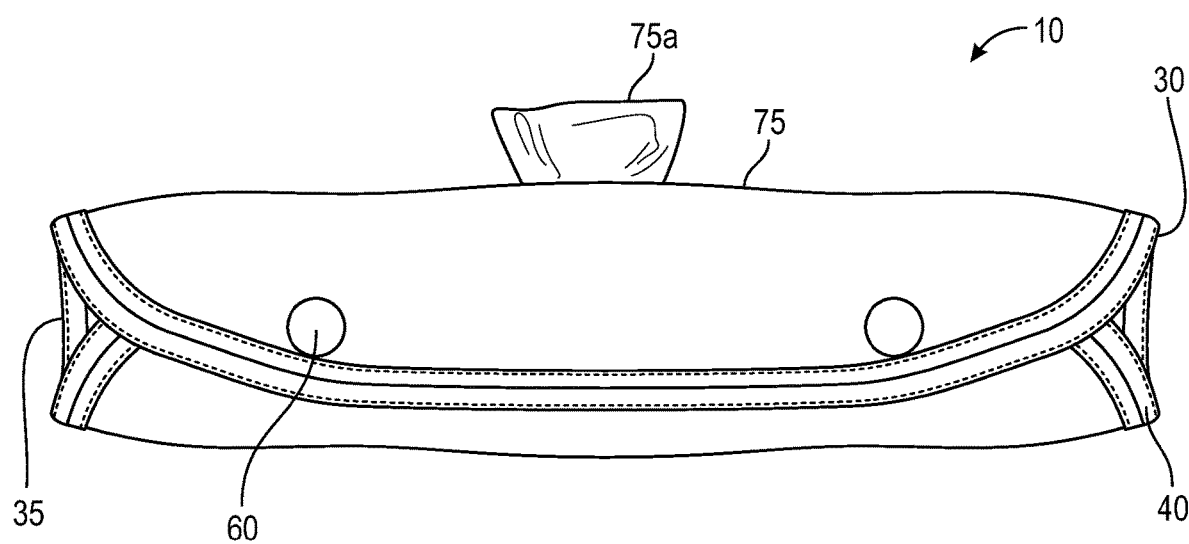
FIG. 4 depicts a front view of a dog waste carrier of the present invention.

Main body 20 opens at the top and includes top section 30, middle section 35, bottom section 40. The sections may be folded along top fold line 32 and bottom fold line 42. As seen in FIG. 4, after folding along the top fold line 32 and bottom fold line 42, dog waste carrier 10 can be securely closed using dog waste carrier fasteners 60. When unfolded, main body pull tabs 45 allow a person to open and close the main body 20 of dog waste carrier 10.

Figure 3:
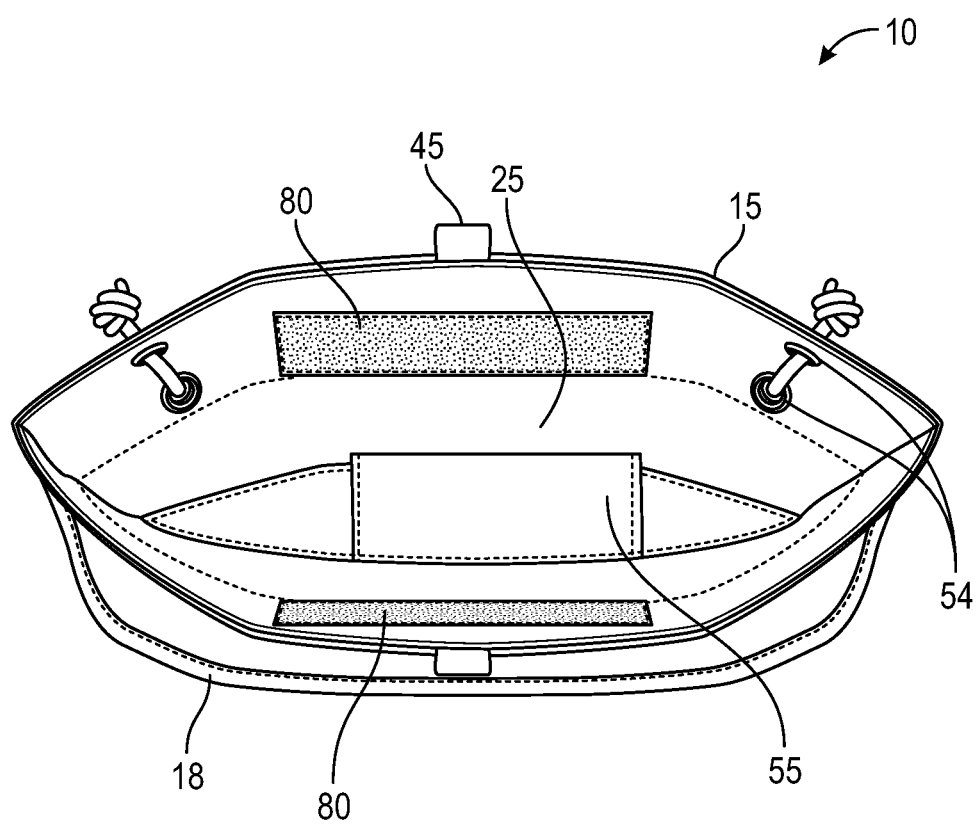
FIG. 3 depicts a top view of a dog waste carrier of the present invention.

In FIG. 1, interior panel 15 includes dog leash attachments 50 that are depicted as cord locks in combination with paracords 52 located on either side of top section 30. As seen in FIG. 3, interior panel has two holes 54 on either side of the top section 30. The holes 54 receive paracords 52, which are threaded through the holes 54 and are combined with (or threaded through) cord locks 50 on the front side of interior panel 15. From there, paracords 52 are tied or otherwise closed to ensure that they remain combined with cord locks 50. The paracords 52 can be adjusted to tighten dog waste carrier 10 along a dog leash 85 and are then locked with cord locks 50 thereby providing for a secure attachment of dog waste carrier 10. Preferably, holes 54, dog leash attachments 50, and paracords 52, are located on either side of top section 30. In other embodiments, dog leash attachments 50 may be embodied as snaps, hooks, clips, or grommets, in which case, the paracords 52 are optional.

Figure 2:
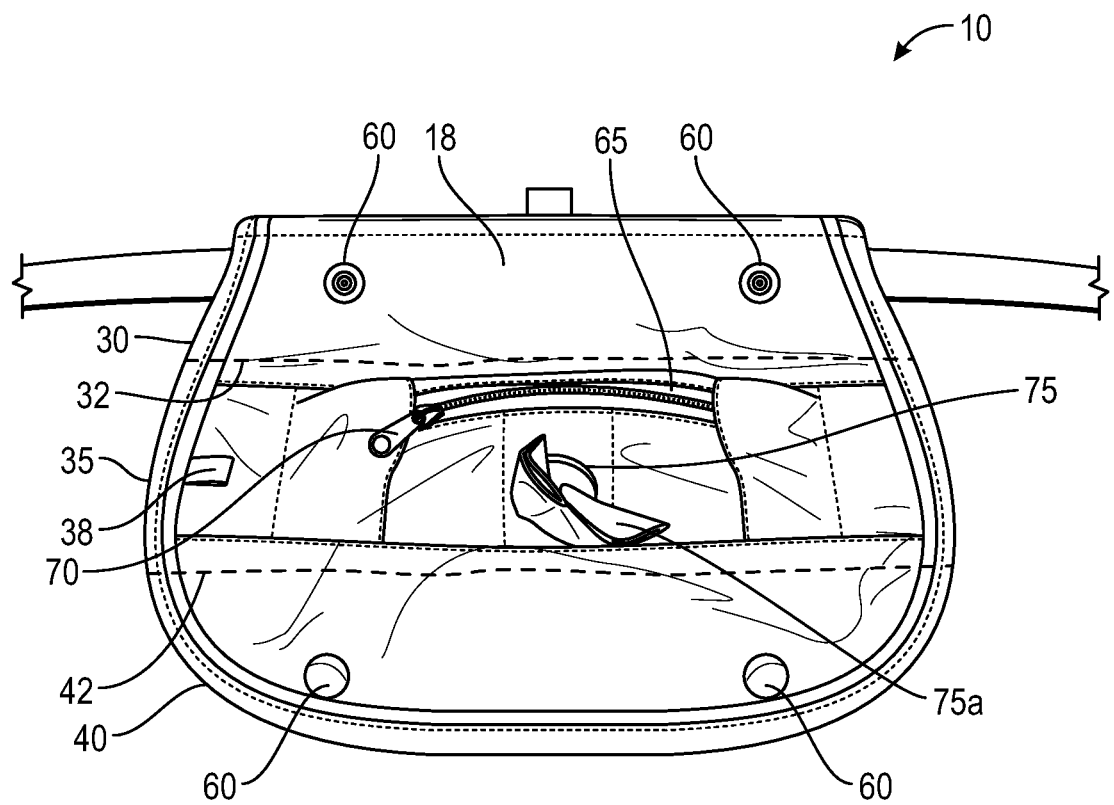
FIG. 2 depicts a front view of a dog waste carrier of the present invention.

FIG. 2 depicts the front of dog waste carrier 10 having exterior panel 18. There are dog waste carrier fasteners 60 at each of the sides of the top section 30 and the bottom section 40. Main body 20 is folded around dog leash 85 such that exterior panel 18 is visible, while interior panel 15 is not visible. When many body 20 is folded first along top fold line 32 and then along bottom fold line 42, the dog waste carrier 10 is closed by connecting the top section 30 and bottom section 40 by way of dog waste carrier attachments 60. Although embodied as snaps in FIG. 2, dog waste carrier fasteners may be any other suitable fastener.

Also depicted in FIG. 2 as part of exterior panel 18 is exterior pouch 65, which includes zipper 70. Exterior pouch 65 is used to hold unused dog waste bags 75a so that they are readily available while walking a dog. Dog waste bags 75a may or may not be dispensed by way of grommet bag dispenser 75 which is located underneath exterior pouch 65.

Loop 38 (FIG. 2) may be used to hold keys or any other items needed during a dog walk. Loop 38 is preferably located in middle section 35, but may be located on top section 30 or bottom section 40. Loop 38 can also be attached to a hook, clip, or other devise so that the dog waste carrier 10 can hang on to a backpack or other devise such that the dog waste carrier 10 is not attached to dog leash 85.

When in use, as shown in FIGS. 1 and 2, a dog leash 85 is threaded through paracords 52 which are then tightened to fit securely around dog leash 85 and locked by way of cord locks 50. A person will then fold main body 20 of dog waste carrier 10 at fold lines 32 and 42 around a dog leash 85 such that exterior panel 18 is visible, while interior panel 15 is no longer visible. The person will close the dog waste carrier 10 by way of dog waste carrier fasteners 60. It is noted that while snaps are depicted in this embodiment of the present invention, it is understood that any other means for closing dog waste carrier 10 may be used, including, but not limited to, buttons, or magnets. Hook and loop panels 80 located on both the interior panel 15 and exterior panel 18 of the interior of main body bag 25 can be used to securely close the dog waste carrier 10.

As shown in FIG. 3, interior pouch 55 is located in the interior of main body 25 and contains a charcoal packet (not shown) or any other deodorizing substance to eliminate or reduce odors from the dog waste. Interior pouch 55 may be a piece of fabric sewn at the top and bottom to either the back side of interior panel 15 or the back side of exterior panel 18, thereby forming a pocket that the charcoal packet can be slid into. Alternatively, interior pouch 55 may be configured as any suitable pouch, including, but not limited to, a slit in the fabric, a zippered opening or any other suitable configuration. Preferably, the interior pouch 55 is located in middle section 35. In alternative embodiments, the interior pouch 55 is located in top section 30 or bottom section 40. In less preferred embodiments, a charcoal packet may be placed directly into the interior of main body 25.

In a preferred embodiment, dog waste carrier 10 is made of nylon having a urethane coating, but it is understood that dog waste carrier can be made of any suitable material.

Figure 5:
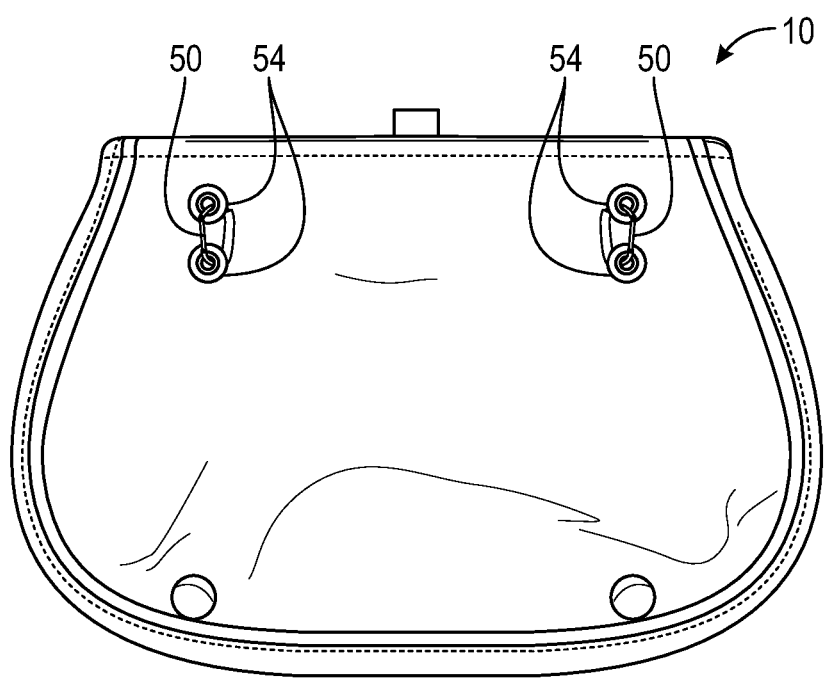
FIG. 5 depicts a back view of another embodiment of a dog waste carrier.
Figure 6:
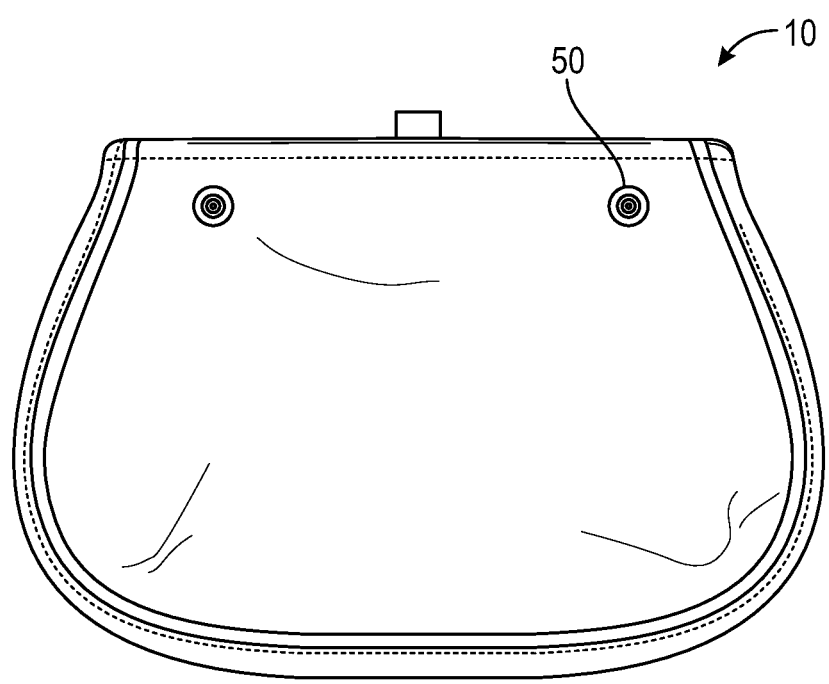
FIG. 6 depicts a back view of another embodiment of a dog waste carrier.

FIGS. 5 and 6 depict additional alternatives arrangements that replace the cord locks 50 and paracords 52. In FIG. 5, dog leash attachments 50 are embodied as hooks that will directly clip onto a dog leash 85 that has corresponding holes. In addition to hooks, grommets, or any metal (or other suitable material) hooking device will work, including, but not limited to, carabiners, buttons, or any other button or clip. In FIG. 6, dog leash attachments are embodied as snaps that can be attached to a dog leash 85 that also has snaps. As in other embodiments, when dog waste carrier 10 is folded first along top fold line 32 and then bottom fold line 42, the dog waste carrier fasteners 60 will connect to close the dog waste carrier 10.

In another alternative arrangement of dog waste carrier 10 whereby paracords 52 and cord locks 50 are replaced by a hook and loop panel (not shown) located within top section 30 of interior panel 15. In another embodiment, the dog waste carrier 10 may be sewn directly onto the leash rather than connecting by hook and loop panel or by dog leash attachments 50. In this way, the dog waste carrier 10 would be permanently attached to the leash. In still another embodiment, dog waste carrier may be incorporated onto a dog leash without any attachment and may be configured and manufactured as a one-piece unit without need for dog leash attachments 50.

Dog waste carrier 10 may also include reflective paneling (not shown) for use during nighttime walks.

It will be appreciated by those skilled in the art that while the dog waste carrier has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A dog waste carrier comprising:
a main body including a top opening and an interior panel having a front and back side and an exterior panel having a front and back side and wherein the interior panel and exterior panel are connected such that an interior of main body is defined by the back side of the interior panel and the back side of an exterior panel;
at least two dog leash attachments located at either side of the top of the front side of interior panel and capable of securing the dog waste carrier to a dog leash;
at least two holes on either side of the top of the interior panel capable of receiving the at least two dog leash attachments and wherein the at least two dog leash attachments are cord locks in combination with paracords and wherein the paracords are threaded through the at least two holes of either side of the top of interior panel; and at least two connectors located on either side of the bottom of the front side of the interior panel that are capable of connecting to at least two corresponding connectors located at either side of the top of the front side of exterior panel.

2. The dog waste carrier of claim 1 further including a hook and loop panel located at the top of the back side of interior panel and a hook and loop panel located at the top of the back side of exterior panel capable of causing the main body to close.

3. The dog waste carrier of claim 1 further including a pouch located in the middle of the front side of exterior panel whereby the pouch includes an opening on the front side of exterior panel and is capable of receiving unused dog waste bags.

4. The dog waste carrier of claim 3 further including a grommet located below the pouch and capable of dispensing unused dog waste bags.

5. The dog waste carrier of claim 2 further including a pouch located in the middle of the front side of exterior panel whereby the pouch includes an opening on the front side of exterior panel and is capable of receiving unused dog waste bags.

6. The dog waste carrier of claim 5 further including a grommet located below the pouch and capable of dispensing unused dog waste bags.

7. The dog waste carrier of claim 1 further including an interior pouch located in the interior of main body.

8. The dog waste carrier of claim 1, wherein the at least two connectors are at least two fasteners having female connectors and are capable of connecting to the at least two corresponding connecters that are at least two fasteners having male connectors.

9. The dog waste carrier of claim 1 wherein the at least two connectors and the at least two corresponding connectors are snaps.

10. The dog waste carrier of claim 2 wherein the at least two connectors and the at least two corresponding connectors are snaps.

11. The dog waste carrier of claim 3 wherein the at least two connectors and the at least two corresponding connectors are snaps.

* * * * *